US012617614B2

(12) United States Patent
Liu

(10) Patent No.: US 12,617,614 B2
(45) Date of Patent: May 5, 2026

(54) ROBOT AND ROBOT-BASED CONTAINER STORAGE AND REMOVAL METHOD

(71) Applicant: BEIJING GEEKPLUS TECHNOLOGY CO., LTD., Beijing (CN)

(72) Inventor: Kai Liu, Beijing (CN)

(73) Assignee: BEIJING GEEKPLUS TECHNOLOGY CO., LTD., Beijing (CN)

( * ) Notice: Subject to any disclaimer, the term of this patent is extended or adjusted under 35 U.S.C. 154(b) by 738 days.

(21) Appl. No.: 17/922,861

(22) PCT Filed: May 24, 2021

(86) PCT No.: PCT/CN2021/095507
§ 371 (c)(1),
(2) Date: Nov. 2, 2022

(87) PCT Pub. No.: WO2022/007517
PCT Pub. Date: Jan. 13, 2022

(65) Prior Publication Data
US 2023/0159274 A1 May 25, 2023

(30) Foreign Application Priority Data
Jul. 8, 2020 (CN) .......................... 202010651759.1

(51) Int. Cl.
*B65G 1/137* (2006.01)
*B25J 5/00* (2006.01)
(Continued)

(52) U.S. Cl.
CPC ............ *B65G 1/1371* (2013.01); *B25J 5/007* (2013.01); *B25J 9/1692* (2013.01); *B25J 13/088* (2013.01);
(Continued)

(58) Field of Classification Search
CPC .... B65G 1/1371; B65G 1/0492; B65G 1/065; B65G 47/905; B65G 2203/0233;
(Continued)

(56) References Cited

U.S. PATENT DOCUMENTS 9,002,506 B1 * 4/2015 Agarwal .............. G06Q 10/087
700/218
11,630,447 B1 * 4/2023 Bhaskaran ........... G05D 1/0088
700/245
(Continued)

FOREIGN PATENT DOCUMENTS

CN 109573449 4/2019
CN 110498172 11/2019
(Continued)

*Primary Examiner* — Thomas Randazzo
(74) *Attorney, Agent, or Firm* — Hodgson Russ LLP

(57) ABSTRACT

A robot and a robot-based container storage and removal method. The robot comprises: a master control processing unit (110), a pick-and-place mechanism (120) and a marker detection unit (130), wherein according to target storage and removal position information of a target inventory container, the master control processing unit (110) controls a robot body to move to a first horizontal position and controls the pick-and-place mechanism (120) to move to a first height position; when the robot body and the pick-and-place mechanism (120) stop moving, the marker detection unit (130) determines a target pick-and-place marker from a target inventory support to which the target inventory container belongs; and the master control processing unit (110) also calibrates the position of the pick-and-place mechanism (120) according to the position of the target pick-and-place marker, so as to control the calibrated pick-and-place mechanism (120) to perform a storage operation or a removal operation on the target inventory container. By means of the solution, a pick-and-place position of a pick-and-place mechanism (120) of the robot can be precisely
(Continued)

Lifting direction

Pick-and-place mechanism

Lifting mechanism

Control a robot body to move to a first horizontal position and control a pick-and-place mechanism to move to a first height position according to target deposit-removal position information of a target inventory container — S610

Detect, by a marker detection device, a target storage position marker provided at a target storage position in a view field including a target inventory bracket in a case that the robot body and the pick-and-place mechanism stop moving — S620

Calibrate a position of the pick-and-place mechanism according to a position of the target storage position marker — S630

Deposit a carried target inventory container at the target storage position on the target inventory bracket in a case that the calibration is completed — S640 positioned and moved, such that the pick-and-place mechanism (120) can quickly and accurately store or remove a target inventory container.

20 Claims, 5 Drawing Sheets

(51) Int. Cl.

| | |
|---|---|
| *B25J 9/16* | (2006.01) |
| *B25J 13/08* | (2006.01) |
| *B25J 15/00* | (2006.01) |
| *B65G 1/04* | (2006.01) |
| *B65G 1/06* | (2006.01) |
| *B65G 47/90* | (2006.01) |
| *B66F 9/06* | (2006.01) |
| *G06Q 10/087* | (2023.01) |

(52) U.S. Cl.

CPC ........ *B25J 15/0014* (2013.01); *B65G 1/0492* (2013.01); *B65G 1/065* (2013.01); *B65G 1/1373* (2013.01); *B65G 47/905* (2013.01); *B66F 9/061* (2013.01); *G06Q 10/087* (2013.01); *B65G 2203/0233* (2013.01); *B65G 2203/0283* (2013.01); *B65G 2203/04* (2013.01); *G05B 2219/45063* (2013.01)

(58) Field of Classification Search

CPC ........ B65G 2203/0283; B65G 2203/04; B65G 1/1376; B65G 1/1373; B25J 5/007; B25J 9/1692; B25J 13/088; B25J 15/0014; B25J 9/1687; B66F 9/061; G06Q 10/087; G05B 2219/45063; G05B 2219/39045; G05B 2219/40006; G05D 1/0234

See application file for complete search history.

(56) References Cited

U.S. PATENT DOCUMENTS

| | | | | |
|---|---|---|---|---|
| 2017/0166399 A1* | 6/2017 | Stubbs | ................. | G06Q 10/087 |
| 2017/0225891 A1* | 8/2017 | Elazary | ................. | G05D 1/0234 |
| 2017/0267452 A1 | 9/2017 | Goren et al. | | |
| 2018/0127212 A1* | 5/2018 | Jarvis | ...................... | G05D 1/247 |
| 2018/0265297 A1* | 9/2018 | Nakano | ................. | B65G 1/1373 |
| 2019/0062053 A1 | 2/2019 | Jensen et al. | | |
| 2020/0324972 A1* | 10/2020 | Cheng | .................. | B65G 1/0435 |
| 2020/0339350 A1* | 10/2020 | Dooley | ................. | B65G 65/02 |
| 2021/0323767 A1* | 10/2021 | Liu | ......................... | B66F 9/122 |
| 2023/0062304 A1* | 3/2023 | Bidram | ................... | B25J 18/04 |

FOREIGN PATENT DOCUMENTS

| | | |
|---|---|---|
| CN | 210028839 | 2/2020 |
| CN | 111056196 | 4/2020 |
| CN | 111348361 | 6/2020 |
| CN | 111824668 | 10/2020 |
| JP | 2001328704 | 11/2001 |
| WO | 2020135460 | 7/2020 |
| WO | 2022007517 | 1/2022 |

* cited by examiner

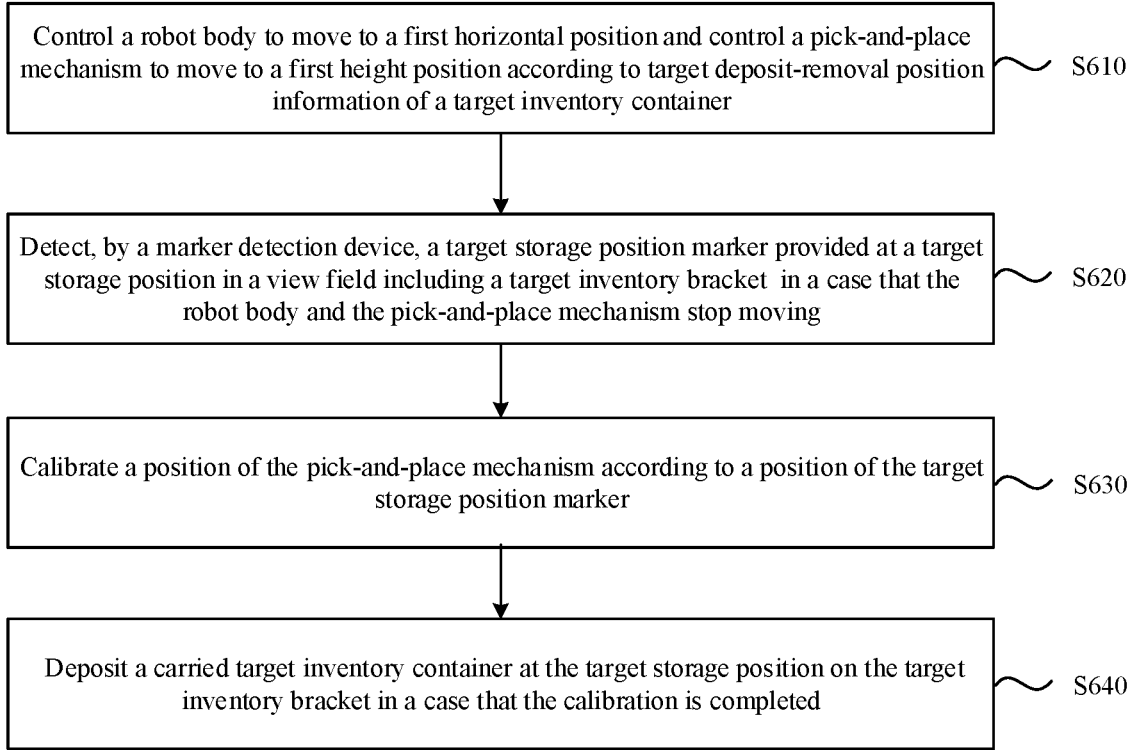

Control a robot body to move to a first horizontal position and control a pick-and-place mechanism to move to a first height position according to target deposit-removal position information of a target inventory container — S610

Detect, by a marker detection device, a target storage position marker provided at a target storage position in a view field including a target inventory bracket in a case that the robot body and the pick-and-place mechanism stop moving — S620

Calibrate a position of the pick-and-place mechanism according to a position of the target storage position marker — S630

Deposit a carried target inventory container at the target storage position on the target inventory bracket in a case that the calibration is completed — S640

FIG. 6

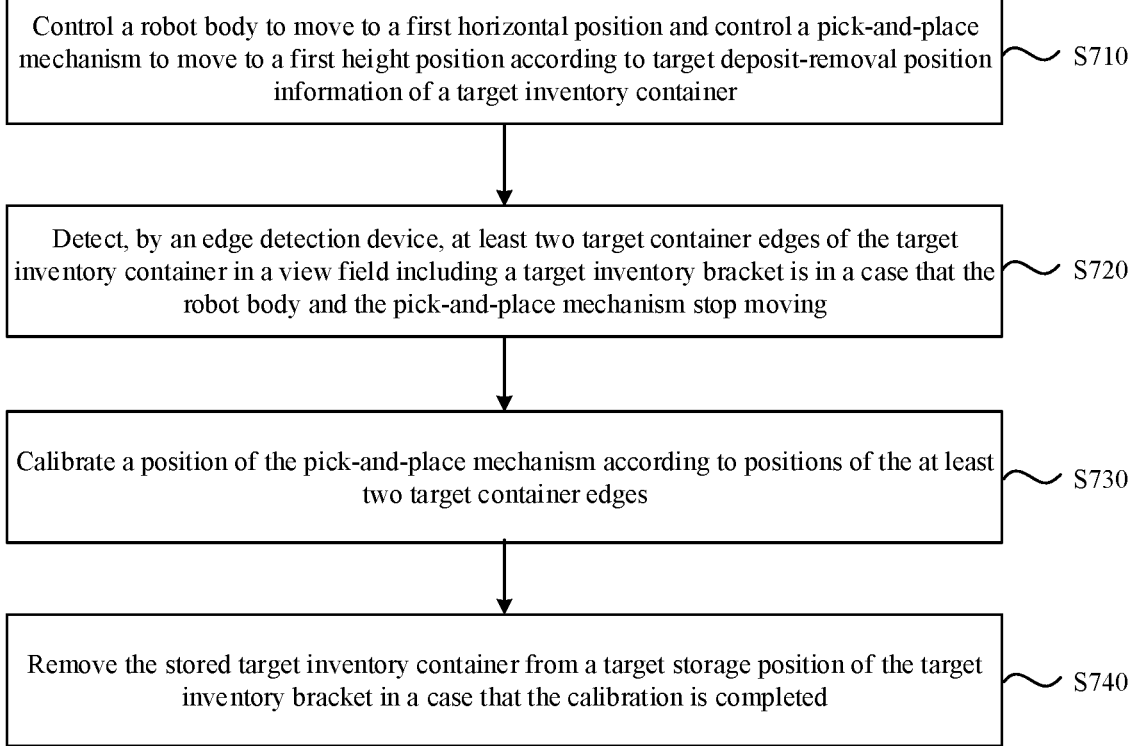

Control a robot body to move to a first horizontal position and control a pick-and-place mechanism to move to a first height position according to target deposit-removal position information of a target inventory container ～ S710

Detect, by an edge detection device, at least two target container edges of the target inventory container in a view field including a target inventory bracket is in a case that the robot body and the pick-and-place mechanism stop moving ～ S720

Calibrate a position of the pick-and-place mechanism according to positions of the at least two target container edges ～ S730

Remove the stored target inventory container from a target storage position of the target inventory bracket in a case that the calibration is completed ～ S740

FIG. 7

ROBOT AND ROBOT-BASED CONTAINER STORAGE AND REMOVAL METHOD

This application claims priority to Chinese Patent Application No. 202010651759.1, titled "ROBOT AND ROBOT-BASED CONTAINER STORAGE AND REMOVAL METHOD", filed on Jul. 8, 2020 with the Chinese Patent Office, which is incorporated herein by reference in its entirety.

FIELD

Embodiments of the present disclosure relate to the technical field of warehousing, and in particular to a robot, and a container depositing method and a container removing method based on the robot.

BACKGROUND

In the warehousing operation scenario, picking and placing containers from or to different layers of a shelf is a common application scenario. The robot can automatically remove a container from a warehouse shelf or place a container on a warehouse shelf for storage.

At present, when picking and placing containers on different layers of a multi-layer shelf, a corresponding height of a container to be picked or placed is required to be located to perform the picking or placing operation. For the robot, the robot is generally instructed to pick or place containers at a preset height. However, if the environment is complex in the warehousing operation scenario, for example, the ground is uneven or an obstacle exists on the ground, the robot may not be able to accurately pick or place the container at the corresponding height, resulting in an inefficiency of depositing or removing containers.

SUMMARY

There are provided a robot and a container depositing method and a container removing method based on the robot according to embodiments of the present disclosure, to accurately and rapidly deposit or remove inventory containers in complex warehousing scenarios, and improve the efficiency of depositing or removing inventory containers.

In a first aspect, a robot is provided according to an embodiment of the present disclosure. The robot includes a master control and processing unit, a pick-and-place mechanism, and a marker detection unit. A body of the robot runs on a plane of a storage region, and the storage region is provided with an inventory bracket for storing an inventory container. The marker detection unit is arranged on the pick-and-place mechanism. The master control and processing unit is configured to: according to target deposit-removal position information of a target inventory container, control the robot body to move to a first horizontal position and control the pick-and-place mechanism to move to a first height position. The marker detection unit is configured to: determine, in a case that the robot body and the pick-and-place mechanism stop moving, a target pick-and-place marker from the target inventory container to which the target inventory container belongs. The master control and processing unit is further configured to: calibrate the position of the pick-and-place mechanism according to a position of the target pick-and-place marker, to control the calibrated pick-and-place mechanism to perform the depositing operation or the removing operation on the target inventory container.

In a second aspect, a container depositing method based on a robot is provided according to an embodiment of the present disclosure. The robot includes a robot body and a pick-and-place mechanism, the robot body runs on a plane of a storage region, and the storage region is provided with an inventory bracket for storing an inventory container. The method includes:

controlling the robot body to move to a first horizontal position and controlling the pick-and-place mechanism to move to a first height position according to target deposit-removal position information of a target inventory container;

detecting, by a marker detection device, a target storage position marker provided at a target storage position in a view field including a target inventory bracket in a case that the robot body and the pick-and-place mechanism stop moving;

calibrating a position of the pick-and-place mechanism according to a position of the target storage position marker; and depositing a carried target inventory container at the target storage position on the target inventory bracket in a case that the calibration is completed.

In a third aspect, a container removing method based on a robot is provided according to embodiment of the present disclosure. The robot includes a robot body and a pick-and-place mechanism, the robot body runs on a plane of a storage region, and the storage region is provided with an inventory bracket for storing an inventory container. The method includes:

controlling the robot body to move to a first horizontal position and controlling the pick-and-place mechanism to move to a first height position according to target deposit-removal position information of a target inventory container;

detecting, by an edge detection device, at least two target container edges of the target inventory container in a view field including a target inventory bracket in a case that the robot body and the pick-and-place mechanism stop moving;

calibrating a position of the pick-and-place mechanism according to positions of the at least two target container edges; and removing the stored target inventory container from a target storage position on the target inventory bracket in a case that the calibration is completed.

The robot is provided according to the embodiments of the present disclosure. The master control and processing unit of the robot may control the robot body to move to the first horizontal position and control the pick-and-place mechanism of the robot to move to the first height according to the target deposit-removal position information of the target inventory container, to quickly move the pick-and-place mechanism to the vicinity of the position where the target inventory container is deposited or removed. The marker detection unit of the robot may determine the target pick-and-place marker from the target inventory bracket to which the target inventory container belongs after the robot body stops at the first horizontal position and the pick-and-place mechanism of the robot stops at the first height position. The master control and processing unit of the robot may further calibrate the position of the pick-and-place mechanism according to the position of the target pick-and-place marker, so that the calibrated pick-and-place mechanism can accurately align with the position where the target inventory container is removed or deposited. In this way, the robot can accurately remove the target inventory container or accurately deposit the carried target inventory container by the position-calibrated pick-and-place mechanism.

With the solutions of the present disclosure, when the inventory container is deposited in or removed from the storage region, the problem that the robot cannot quickly and accurately remove the inventory container or deposit the inventory container due to the position deviation of the pick-and-place mechanism in the case of the uneven ground of the storage region can be solved, to ensure that the pick-and-place mechanism can quickly and accurately align with the position where the target inventory container is deposited or removed, thereby improving the efficiency of the robot depositing or removing the inventory container in the storage region, without greatly increasing the equipment cost.

The above-mentioned summary is only an overview of the technical solutions of the present disclosure. In order to understand the technical means of the present disclosure more clearly to implement the technical solutions in accordance with the contents of the description, and in order to make the above and other purposes, features and advantages of the present disclosure more apparent and easy to be understood, the specific embodiments of the present disclosure are described below.

BRIEF DESCRIPTION OF THE DRAWINGS

Other features, objects and advantages of the present disclosure are more apparent by reading the detailed description of non-limited embodiments with reference to the drawings. The drawings are for purposes of illustrating preferred embodiments only and are not to be regarded as limiting of the present disclosure. Further, the same components are denoted by the same reference numerals throughout the drawings. In the drawings:

FIG. 6 is a schematic flowchart showing a container depositing method based on a robot according to an embodiment of the present disclosure; and FIG. 7 is a schematic flowchart showing a container removing method based on a robot according to an embodiment of the present disclosure.

DETAILED DESCRIPTION OF EMBODIMENTS

The present disclosure is further described in detail below with reference to the drawings and the embodiments. It should be understood that the specific embodiments described herein are only used to explain the present disclosure, but not to limit the present disclosure. It should further be noted that, for the convenience of description, the drawings only show some but not all structures related to the present disclosure.

Before discussing the exemplary embodiments in detail, it should be noted that some of the exemplary embodiments are described as processes or methods depicted as flowcharts. Although various operations (or steps) are depicted as being processed in sequence in the flowchart, many of the operations (or steps) may be performed in parallel, concurrently, or simultaneously. Additionally, the order of operations may be rearranged. The process may be terminated when the operation is complete, but may have additional steps not included in the figures. The process may correspond to a method, function, procedure, subroutine, subprogram, and the like.

The container described in the embodiments of the present disclosure includes, for example, an inventory container, a cargo box, a storage basket, and other objects that can be used to deposit or store goods or commodities.

In order to better understand the technical solutions of the present disclosure, a solution for depositing or removing an inventory container is provided below. For example, in a warehousing operation scenario, containers may be picked from or placed on different compartments of a shelf, which is described in detail as follows. A MiniLoad three-dimensional container warehouse equipment runs on a high-precision track, and a position of a container picking mechanism in the three-dimensional container warehouse equipment is controlled by means of the locating of the high-precision track. A shuttle trolley Shuttle in the three-dimensional container warehouse equipment picks one material container each time, and the container picking mechanism does not lift up and down. Further, the trolley runs on the track. In addition, the position of the container picking mechanism may be determined by locating the position of the trolley body on the track. However, this type of equipment costs very high and cannot be applied on a large scale. Therefore, it is an urgent problem to be solved how to accurately and quickly deposit or remove the container with a small increase in the equipment cost.

A robot, and a container depositing method and a container removing method based on the robot according to embodiments of the present disclosure are described in detail below by the embodiments and optional solutions of the embodiments.

Figure 1:
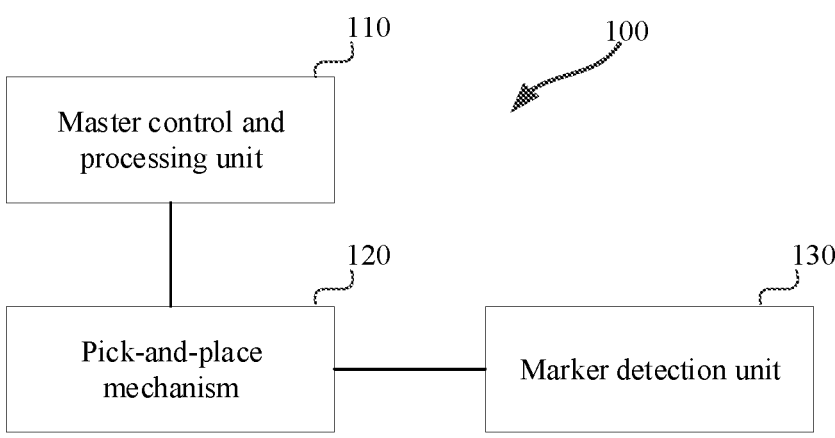
FIG. 1 is a structural block diagram of a robot according to an embodiment of the present disclosure.

FIG. 1 is a structural block diagram of a robot according to an embodiment of the present disclosure. This embodiment may be implemented to deposit or remove an inventory container, for example, in a situation where an inventory container on an inventory bracket is quickly and accurately removed, or an inventory container is quickly and accurately deposited in an inventory bracket. As shown in FIG. 1, the robot provided in the embodiment of the present disclosure may include: a master control and processing unit 110, a pick-and-place mechanism 120, and a marker detection unit 130. A body of the robot runs on a plane of a storage region, and the storage region is provided with an inventory bracket for storing an inventory container. The marker detection unit 130 is arranged on the pick-and-place mechanism 120.

The master control and processing unit 110 is configured to: according to target deposit-removal position information of a target inventory container, control the robot body to move to a first horizontal position and control the pick-and-place mechanism 120 to move to a first height position.

In this embodiment, the robot in the solution of the present disclosure may run on any plane of the storage region, rather than a high-precision track. For example, in a floor-type warehousing operation scenario, the robot may run directly on a ground of the storage region. In addition, in a platform-based warehousing operation scenario, the robot may directly run on a surface of a platform partition deployed in the storage region.

Figure 2:
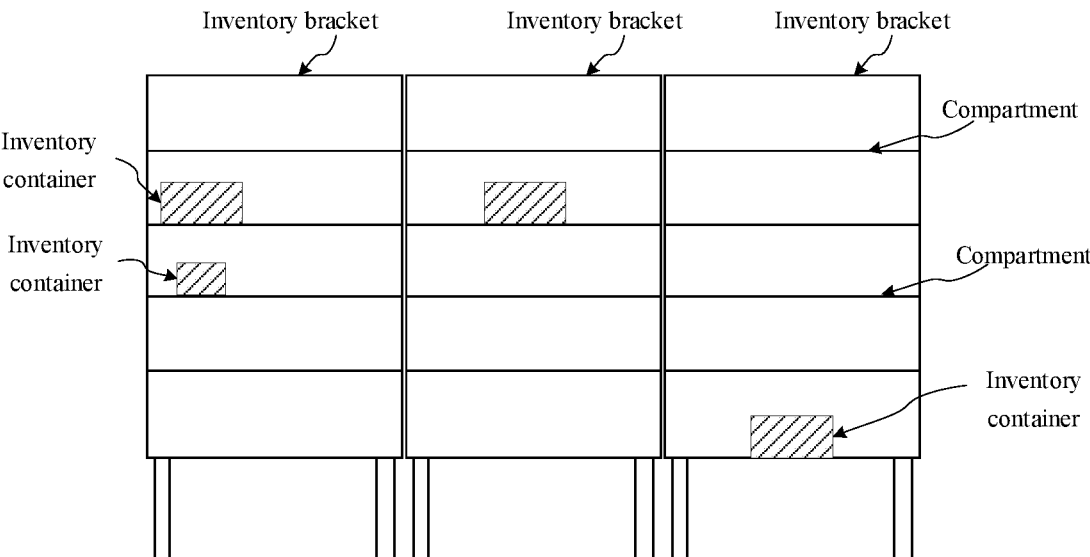
FIG. 2 is a schematic structural diagram showing an inventory bracket deployed in a storage region according to in an embodiment of the present disclosure.

In this embodiment, FIG. 2 is a schematic structural diagram showing an inventory bracket deployed in a storage region according to an embodiment of the present disclosure. Referring to FIG. 2, for example, multiple inventory brackets are deployed in the storage region, and each inventory bracket has multiple compartments, and heights of different compartments on the inventory bracket may be the same or different. Each compartment includes at least one storage position. Each storage position may be used to store, for example, at least one inventory container. The inventory bracket deployed in the storage region may be used to store the inventory container. In the storage region, the inventory bracket may be a bracket or the like for holding the inventory container such as various goods or material boxes.

In this embodiment, the target inventory container may be an inventory container that requires a container depositing operation or a container removing operation. The container depositing operation may include an operation of depositing one or more inventory containers into the storage position of the inventory bracket. The container removing operation may include an operation of removing one or more inventory containers from the storage position of the inventory bracket. The target deposit-removal position information may be a deposit position of the target inventory container that requires the container depositing operation in the storage region, or may be a removal position of the target inventory container that requires the container removing operation in the storage region. The target deposit-removal position information may be a three-dimensional coordinate position information, which may include a horizontal position on the plane of the storage region and a height position relative to the plane of the storage region. For example, the target deposit-removal position information may be (Xt, Yt, Zt), where (Xt, Yt) represents a horizontal position of the target inventory container on the plane of the storage region, and Zt represents a height position of the target inventory container relative to the plane of the storage region.

In this embodiment, the robot master control and processing unit 110 may acquire a navigation path of the robot on the plane of the storage region according to a horizontal position coordinate indicated by the target deposit-removal position information. The robot body may travel along the navigation path planned according to the horizontal position coordinate indicated by the target deposit-removal position information to a first horizontal position aligned with the horizontal position indicated by the target deposit-removal position information and stop traveling. The first horizontal position may be a position of a travel channel on a side of the target inventory bracket to which the target inventory container belongs, which is determined by, for example, the horizontal position indicated by the target deposit-removal position information.

For example, the following description is given by taking a spatial position coordinate indicated by the target deposit-removal position information being (Xt, Yt, Zt) as an example. The robot body may travel along the navigation path to a first horizontal position coordinate (Xr, Yr) aligned with the horizontal position coordinate (Xt, Yt) indicated by the target deposit-removal information and stop the traveling. If a pick-and-place direction of the pick-and-place mechanism of the robot for the target inventory container is an X axis direction, Yr=Yt. If the pick-and-place direction of the pick-and-place mechanism of the robot for the target inventory container is a Y axis direction, Xr=Xt.

In this embodiment, since the pick-and-place mechanism on the robot and the robot body move synchronously in the horizontal direction, the pick-and-place mechanism of the robot synchronously moves to the first horizontal position in the horizontal direction when the robot body travels to the first horizontal position on the plane of the storage region, that is, the pick-and-place mechanism 120 of the robot can move to the first horizontal position aligned with the horizontal position indicated by the target deposit-removal position information.

Figure 3:
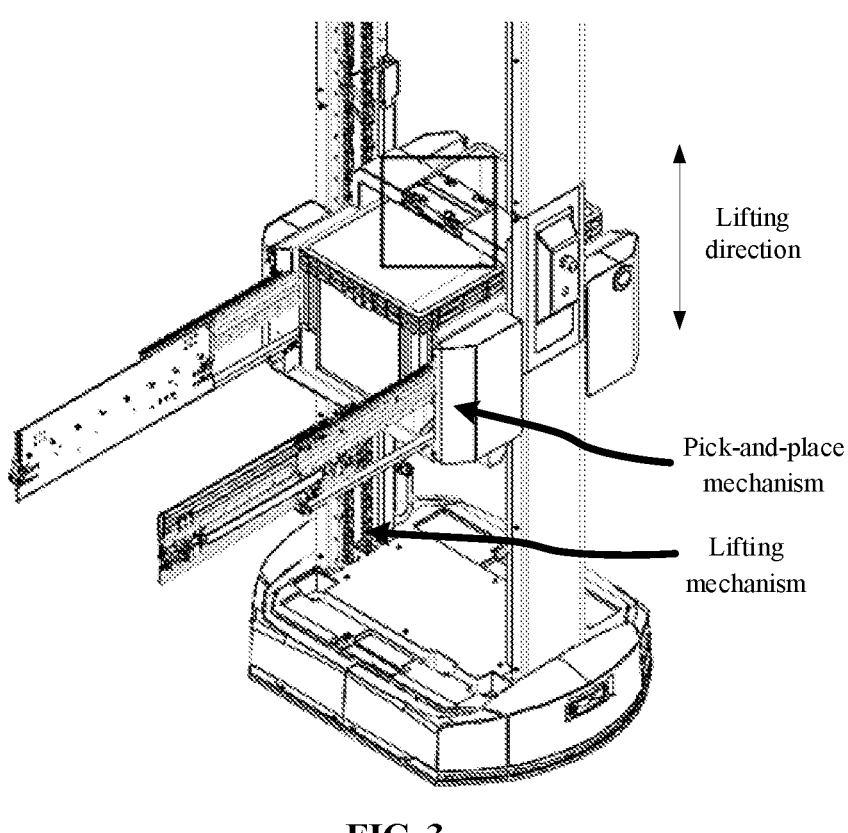
FIG. 3 is a schematic structural diagram of a robot according to an embodiment of the present disclosure.

In this embodiment, in the scenario of depositing or removing inventory containers, since heights of the inventory containers required to be deposited or removed are different, the robot is required to be provided with the pick-and-place mechanism 120 capable of raising the height. FIG. 3 is a schematic structural diagram of a robot according to an embodiment of the present disclosure. Referring to FIG. 3, the master control and processing unit 110 of the robot may control the pick-and-place mechanism 120 of the robot to raise and lower the height. The master control and processing unit 110 of the robot may control, according to the height position indicated by the target deposit-removal position information, the pick-and-place mechanism 120 of the robot to be lifted to a first height position relative to the plane of the storage region, so that the first height position and the height position indicated by the target deposit-removal position information are as identical as possible. In this way, the pick-and-place mechanism 120 of the robot can be controlled to quickly reach the vicinity of a position where the operation of depositing or removing the target inventory container is performed.

In this embodiment, optionally, the robot has a function of locating in the storage region. In the process of the robot body traveling according to the planned navigation path, a horizontal position of the robot body moving on the plane of the storage region and a traveling direction of the robot body may be determined in real time, so as to timely correct a traveling deviation of the robot body on the plane of the storage region, thereby avoiding a large traveling deviation. Optionally, a chassis drive capable of driving the robot body to move is provided at the bottom of the robot body.

For example, the master control and processing unit 110 of the robot may calculate in real time a two-dimensional coordinate (x, y) of a vertical projection center point of the robot body on the plane of the storage region and a traveling direction angle θ of the robot body on the plane of the storage region in the navigation and traveling process of the robot body. Optionally, the robot may travel on the plane of the storage region by means of SLAM navigation, two-dimensional code vision+inertial navigation, or the like.

The marker detection unit 130 is configured to: in a case that the robot body and the pick-and-place mechanism 120 stop moving, determine a target pick-and-place marker from the target inventory bracket to which the target inventory container belongs.

In this embodiment, referring to FIG. 1 and FIG. 3, the pick-and-place mechanism 120 of the robot may be moved to the first horizontal position on the plane of the storage region and may be lifted to the first height position relative to the plane of the storage region. However, since the horizontal position and the height position of the pick-and-place mechanism are both determined with reference to the plane of the storage region where the robot body runs, the first horizontal position and the first height position are not the best positions for the pick-and-place mechanism if the plane of the storage region is not flat. This is because that, if the plane of the storage region is not flat, a vertical deviation of the pick-and-place mechanism may occur after the height is raised, so that the horizontal position of the pick-and-place mechanism cannot be determined with reference to the horizontal position of the robot body. Further, since the plane of the storage region is not flat, a movement deviation during the movement of the robot or a height deviation during the height raising process may occur.

Based on the above analysis, if the plane of the storage region is not flat, after the robot body stops moving and the pick-and-place mechanism 120 stops raising the height, a large position deviation may possibly exist between the stop position of the pick-and-place mechanism 120 of the robot in the air and the depositing or removal position of the target inventory container, so that the pick-and-place mechanism of the robot cannot quickly align the depositing or removal position of the target inventory container, which seriously affects the efficiency of depositing or removing the inventory container. Therefore, after the robot body is moved to the first horizontal position and the pick-and-place mechanism is lifted to the first height position, the position of the end of the pick-and-place mechanism in the air that is determined with reference to the robot body and the plane of the storage region where the body runs cannot be completely relied on, and it is necessary to adjust and calibrate the position of the pick-and-place mechanism in the case where the robot body is moved to the first horizontal position and the height of the pick-and-place mechanism is raised to the first height position, so as to reduce an error between the pick-and-place mechanism and the depositing or removal position.

In this embodiment, the plane of the storage region is not flat, which may result in a slight deviation between the position of the pick-and-place mechanism and a desired position. However, even if the pick-and-place mechanism deviates, usually the pick-and-place mechanism may not be completely deviated from the depositing or removal position of the target inventory container, that is, the position of the pick-and-place mechanism is usually in a certain deviation distance range of the depositing or removal position of the target inventory container. In this case, the marker at the depositing or removal position of the target inventory container is fully usable for the position calibration.

In this embodiment, a fixed or dynamically set pick-and-place marker for assisting the robot in calibrating the position of the pick-and-place mechanism is provided on the inventory bracket. Based on the above, after the robot body is moved to the first horizontal position and the pick-and-place mechanism is lifted to the first height, the robot may collect a pick-and-place marker toward the target inventory bracket to which the target inventory container belongs. Since the robot collects the pick-and-place marker at the stop position after the movement and the height lifting, and the stop position of the pick-and-place mechanism of the robot is close to the depositing or removal position of the target inventory container, the collected pick-and-place marker is a target pick-and-place marker required to calibrate the position of the pick-and-place mechanism. The target inventory bracket may be an inventory bracket deployed in the storage region for storing the target inventory container.

The master control and processing unit 110 is further configured to calibrate the position of the pick-and-place mechanism 120 according to a position of the target pick-and-place marker, to control the calibrated pick-and-place mechanism 120 to perform the depositing operation or the removing operation on the target inventory container.

In this embodiment, the target pick-and-place marker is fixedly set or dynamically set on the target inventory bracket to which the target inventory container belongs, and the target pick-and-place marker may be used to assist in locating the deposing position or the removal position of the target inventory container on the target inventory bracket. Therefore, the position of the pick-and-place mechanism of the robot may be adjusted by means of the position of the target pick-and-place marker on the target inventory bracket, to realize the position calibration between the position of the pick-and-place mechanism and the deposit position or the removal position of the target inventory container on the target inventory bracket. In this way, since the position of the pick-and-place mechanism has been calibrated with the deposit position or the removal position of the target inventory container on the target inventory bracket, the target inventory container can be quickly and accurately deposited or removed by the position-adjusted pick-and-place mechanism, without the case that the target inventory container cannot be quickly deposited or removed due to the position deviation, which improves the efficiency of depositing or removing the container.

In this embodiment, the inventory bracket is provided with multiple compartments having different heights, and each compartment is provided with at least one storage position, and the storage position is used for storing the inventory container. The pick-and-place mechanism 120 of the robot is configured to: remove the stored target inventory container from a target storage position on the target inventory bracket in a case that the calibration is completed. In addition, the pick-and-place mechanism 120 of the robot is configured to: deposit a carried target inventory container at the target storage position on the target inventory bracket in a case that the calibration is completed.

A robot is provided according to the embodiments of the present disclosure. With the solution of the present disclosure, when the robot deposits or removes the inventory container in the storage region, the problem that the robot cannot accurately locate and move the pick-and-place position of the pick-and-place mechanism in the case of the uneven ground of the storage region can be solved, so that the pick-and-place mechanism can quickly and accurately align with the depositing or removal position of the target inventory container, thereby improving the efficiency of the robot depositing or removing the inventory container in the storage region, without greatly increasing the equipment cost.

In an optional solution of this embodiment, the embodiment of the present disclosure may be combined with each optional solution in the above-mentioned one or more embodiments. Referring to FIG. 1 and FIG. 3, in the robot provided in the embodiment, the robot body is further provided with a lifting mechanism for lifting the pick-and-place mechanism 120.

The master control and processing unit 110 of the robot is further configured to control the lifting mechanism to lift the pick-and-place mechanism 120 of the robot.

The master control and processing unit 110 of the robot is further configured to: detect a height of the pick-and-place mechanism 120 relative to the plane of the storage region in real time, and stop the lifting when the pick-and-place mechanism 120 is lifted to the first height position.

In this embodiment, referring to FIG. 3, the pick-and-place mechanism of the robot may include a lifting mechanism, by which the pick-and-place mechanism of the robot can be lifted and/or lowered to a preset height. Optionally, while controlling the robot body to move to the first horizontal position of the plane of the storage region, the lifting mechanism for the pick-and-place mechanism is controlled to raise the height of the pick-and-place mechanism of the robot relative to the plane of the storage region. Still optionally, after controlling the robot body to move to the first horizontal position of the plane of the storage region and stops moving, the lifting mechanism for the pick-and-place mechanism is controlled to raise the height of the pick-and-place mechanism of the robot relative to the plane of the storage region.

In this embodiment, when raising the height of the pick-and-place mechanism 120, the pick-and-place mechanism 120 is not controlled to be lifted all the time, and the lifting is stopped after the pick-and-place mechanism is lifted to the first height position. Optionally, the height of the pick-and-place mechanism relative to the plane of the storage region may be detected in real time by means of a wire-pull encoder or a position detection sensor. If it is detected that the height of the pick-and-place mechanism relative to the plane of the storage region where the robot runs reaches the first height position, the lifting mechanism for the pick-and-place mechanism is controlled to stop the lifting.

In this embodiment, the first height position is determined based on a height position indicated by the target deposit-removal position information of the target inventory container in the storage region. When raising the height of the pick-and-place mechanism relative to the plane of the storage region, the first height is generally required to be consistent with the height indicated by the target deposit-removal position information, that is, it is ensured that the first height position is level with the height position indicated by the target deposit-removal position information, so as to facilitate the operation of depositing or removing the inventory container.

In this embodiment, it is considered that when a container depositing operation or a container removing operation is performed on the target inventory container, a push-pull manner is selected to be used for depositing or removing the target inventory container. If the first height is kept the same as the height indicated by the target deposit-removal position information, a joint seam between the pick-and-place mechanism and the storage position of the target inventory bracket to which the target inventory container belongs may result in a push-pull jam in the process of pushing or pulling the target inventory container. Therefore, it is required to set a deviation between the first height and the height indicated by the target deposit-removal position information according to the container depositing operation or the container removing operation performed by the robot on the target inventory container, to overcome the push-pull jam caused by the joint seam.

In this embodiment, optionally, in the case that the pick-and-place mechanism of the robot deposits the carried target inventory container into the target inventory bracket, the relative height indicated by the first height position is greater than a storage height indicated by the target deposit-removal position information. In this case, the first height of the pick-and-place mechanism of the robot is slightly higher than the height indicated by the target deposit-removal position information. For example, if the height indicated by the target deposit-removal position information is Zt, the first height may be set as Zt+10 mm, to ensure that the target inventory container carried by the pick-and-place mechanism located at the first height can be pushed by the pick-and-place mechanism to a storage position of a target inventory bracket compartment located at the storage height indicated by the target deposit-removal position information to complete the container depositing operation. In this way, when pushing the target inventory container to the storage position of the target inventory bracket compartment, the container push jam caused due to the joint seam between the storage position of the target inventory bracket compartment and the pick-and-place mechanism can be avoided.

In this embodiment, optionally, in the case that the pick-and-place mechanism removes the target inventory container from the target inventory bracket, the relative height indicated by the first height position may be set to be smaller than the storage height indicated by the target deposit-removal position information. In this case, the first height of the pick-and-place mechanism of the robot is slightly lower than the storage height indicated by the target deposit-removal position information. For example, if the storage height indicated by the target deposit-removal position information is Zt, the first height may be set as Zt−10 mm, to ensure that the target inventory container located at the storage position of the target inventory bracket compartment at the storage height is pulled by the pick-and-place mechanism to the pick-and-place mechanism located at the first height to complete the container removing operation. In this way, when pulling the target inventory container to the pick-and-place mechanism located at the first height, the container pull jam caused due to the joint seam between the storage position of the target inventory bracket compartment and the pick-and-place mechanism can be avoided.

In an optional solution of this embodiment, the embodiment of the present disclosure may be combined with each optional solution in the above-mentioned one or more embodiments. Referring to FIG. 1 and FIG. 2, in the robot provided in this embodiment, a storage position marker is provided at a preset position of the storage position of the inventory bracket. The marker detection unit 130 of the robot may include a marker detection device. The marker detection device is configured to: in a case that the pick-and-place mechanism is required to deposit the target inventory container, detect a target storage position marker provided at the target storage position in a view field including the target inventory bracket, and determine the detected target storage position marker as the target pick-and-place marker.

In this embodiment, the storage region where the robot runs is provided with the inventory bracket, and the storage position of the inventory bracket is allowed to store the inventory containers. In this case, for the operation of depositing the target inventory container, the calibration may be performed by means of the storage position marker provided at the storage position to which the target inventory container is required to be deposited. Optionally, the storage position marker may be set at a preset position of the storage position of the inventory bracket, and the storage position marker can be used to assist in locating the storage position required by the target inventory container, so as to perform the container depositing operation. For example, a storage position marker associated with each storage position may be added to a beam of the storage position of each compartment of an inventory bracket (such as a shelf), where the storage position marker may be a box, a two-dimensional code, or a circular marker.

In this embodiment, the target inventory bracket may include multiple compartments, and each compartment may include multiple storage positions. In this case, there may be multiple storage position markers near the stop position after the movement to the first horizontal position and the height lifting to the first height. In order to ensure that the robot can accurately acquire the pick-and-place marker required for performing the container depositing operation on the target inventory container, a detection view field of the marker detection device of the robot may be set, to realize that the detection view field of the marker detection device at the stop position of the pick-and-place mechanism only includes the target storage position marker provided at the target storage position where the target inventory container is to be stored on the target inventory bracket as far as possible, so that the target storage position marker provided at the target storage position on the target inventory bracket is included in the detection view field of the marker detection device. In this way, the storage position marker located in the detection view field of the marker detection device of the robot is the storage position marker at the position of the storage position for storing the target inventory container.

Figure 4:
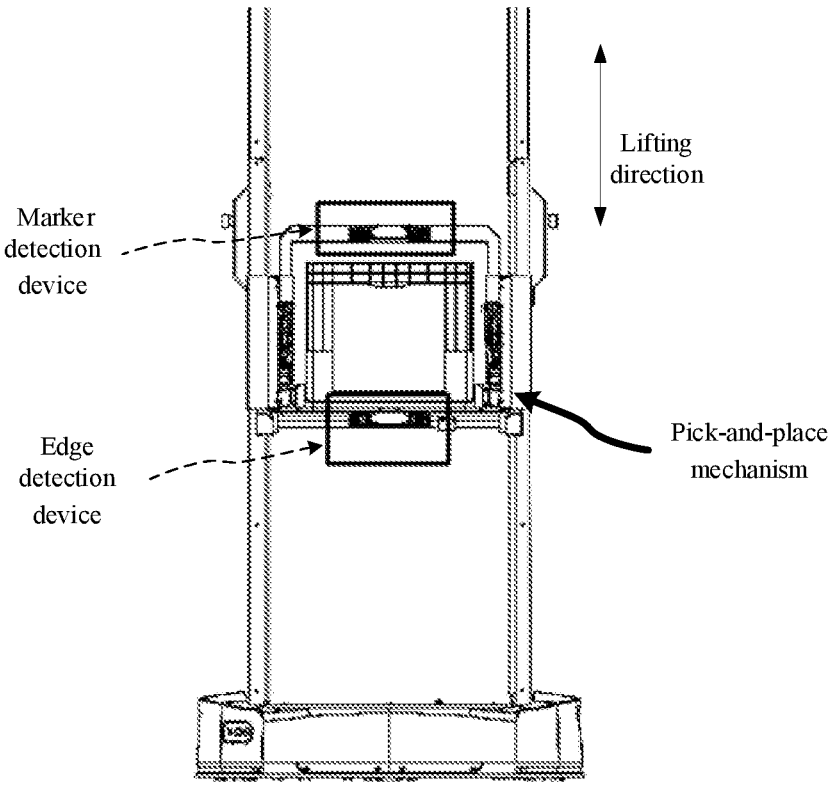
FIG. 4 is a schematic structural diagram of a robot including a pick-and-place mechanism according to an embodiment of the present disclosure.

In this embodiment, FIG. 4 is a schematic structural diagram of a robot including a pick-and-place mechanism according to an embodiment of the present disclosure. Optionally, referring to FIG. 3 and FIG. 4, the pick-and-place mechanism 120 of the robot includes a fork holding assembly. The marker detection device for detecting the storage position marker is arranged at the lower end of the fork holding assembly, and the storage position marker at a distance from the marker detection device being less than a predetermined distance is in the detection view field of the marker detection device. In this way, as long as the robot body moves to the first horizontal position and the pick-and-place mechanism of the robot moves to the first height position, the storage position marker included in the detection view field of the marker detection device can be the target pick-and-place marker required for performing the container depositing operation on the target inventory container.

In this embodiment, optionally, the marker detection device may be a photographing camera, which may be arranged at the lower end of the pick-and-place mechanism. When the robot body reaches the first horizontal position and the pick-and-place mechanism reaches the first height position, the pick-and-place mechanism of the robot reaches the vicinity of the spatial position indicated by the first horizontal position and the first height position. In this case, the storage position marker of the storage position required for performing the container depositing operation on the target inventory container is in the detection view field of the marker detection device arranged at the lower end of the fork holding assembly of the pick-and-place mechanism.

In another optional solution of this embodiment, the embodiment of the present disclosure may be combined with each optional solution in the above-mentioned one or more embodiments. Referring to FIG. 1 and FIG. 2, in the robot provided in the solution of this embodiment, the marker detection unit 130 of the robot may include an edge detection device. The edge detection device is configured to: in a case that the pick-and-place mechanism is required to remove the target inventory container, detect at least two target container edges of the target inventory container in the view field including the target inventory bracket, and determine the detected at least two target container edges as the target pick-and-place marker.

In this embodiment, the storage region where the robot runs is provided with the inventory bracket, and the storage position of the inventory bracket is allowed to store the inventory containers. In this case, if the target inventory container is required to be removed from the storage position, at least two container edges of the target inventory container placed at the storage position of the target inventory bracket may be detected. The container edge belongs to a container structure at a fixed position on the target inventory container, and the container edge is used to assist in locating the target inventory container placed at the storage position, so as to perform the container removing operation.

In this embodiment, referring to FIG. 4, the edge detection device for detecting the container edge of the inventory container is arranged at the upper end of the fork holding assembly of the pick-and-place mechanism of the robot, and the inventory container at a distance from the edge detection device being less than a predetermined distance is in the detection view field of the edge detection device. In this way, as long as the robot body is controlled to move to the first horizontal position and the pick-and-place mechanism of the robot is controlled to be lifted to the first height position according to the target deposit-removal position information of the target inventory container, the inventory container at the spatial position indicated by the first horizontal position and the first height position can be in the detection view field of the edge detection device.

In this embodiment, optionally, the edge detection device may be a photographing camera, which may be arranged at a position above the center of the fork holding assembly of the pick-and-place mechanism. When the robot body moves to the first horizontal position and the pick-and-place mechanism of the robot is controlled to be lifted to the first height position, the pick-and-place mechanism of the robot reaches the vicinity of the spatial position indicated by the first horizontal position and the first height position. In this case, the target inventory container is in the detection view field of the edge detection device arranged at the upper end of the fork holding assembly of the pick-and-place mechanism, so that upper and lower container edges and left and right container edges of the target inventory container can be all detected while facing a side of the target inventory container. In this way, the target container edge in the detection view field of the edge detection device of the robot can be used as the target pick-and-place marker required for calibrating the pick-and-place mechanism. The target container edge is a container structure feature at the edge of the target inventory container, and the target container edge is used to assist in locating the target inventory container placed at the target storage position, so as to perform the container removing operation.

Exemplarily, in order to accurately calculate the container center of the target inventory container, the edge detection device may acquire at least three container edges from at least three sides of the target inventory container facing a side of the target inventory container, or acquire a complete container edge of the target inventory container.

In an optional solution of this embodiment, the embodiment of the present disclosure may be combined with each optional solution in the above-mentioned one or more embodiments. Referring to FIG. 1 and FIG. 2, in the robot provided in this embodiment, the master control and processing unit 110 of the robot may calibrate the position of the pick-and-place mechanism 120 of the robot according to the position of the target pick-and-place marker.

The master control and processing unit 110 is further configured to: determine a relative position deviation between a marker center of the target pick-and-place marker and a preset position of the pick-and-place mechanism. The relative position deviation includes a horizontal position deviation and/or a height position deviation.

The master control and processing unit 110 is further configured to: if the relative position deviation of the pick-and-place mechanism 120 does not meet a preset deviation condition, control the robot body to move from the first horizontal position to a second horizontal position, to drive a horizontal position adjustment of the pick-and-place mechanism of the robot; and/or control the pick-and-place mechanism of the robot to move from the first height position to a second height position, so that a relative position deviation between the marker center and the preset position of the pick-and-place mechanism after the movement meets the preset deviation condition.

In this embodiment, optionally, in the case that the pick-and-place mechanism 120 of the robot deposits the target inventory container carried by itself into the target inventory bracket, the type of the pick-and-place marker is the storage position marker provided at the preset position of the storage position of the inventory bracket, and in this case, the marker center of the target pick-and-place marker is the marker center of the storage position marker. Still optionally, in the case that the pick-and-place mechanism 120 of the robot removes the target inventory container from the target inventory bracket, the type of the pick-and-place marker is the container edge of the inventory container stored at the storage position of the inventory bracket, and in this case, the marker center of the target pick-and-place marker is the container center of the target inventory container determined by at least two container edges of the target inventory container. The preset position of the pick-and-place mechanism of the robot may be the center position of the fork holding assembly in the pick-and-place mechanism of the robot.

In this embodiment, the marker detection device or the edge detection device provided in the present disclosure may be a photographing camera, and the photographing camera required by the marker detection device or the edge detection device may be installed at the preset position of the pick-and-place mechanism according to requirements. By the marker detection device or edge detection device pre-calibrated on the pick-and-place mechanism, the photographing can be quickly determined, and the relative position deviation between the marker center of the target pick-and-place marker and the preset position of the pick-and-place mechanism can be determined. For example, by the marker detection device pre-calibrated on the pick-and-place mechanism of the robot, the marker center of the target storage marker obtained by the photographing can be quickly determined, and the relative position deviation between the marker center of the target storage marker and the preset position of the pick-and-place mechanism can be determined. For another example, by the edge detection device pre-calibrated on the pick-and-place mechanism of the robot, the container center of the target inventory container obtained by the photographing can be quickly determined, and further the relative position deviation between the container center of the target inventory container and the preset position of the pick-and-place mechanism can be determined.

In this embodiment, if it is detected that the relative position deviation is greater than a set threshold, the robot body is controlled to move horizontally to drive the horizontal position adjustment of the pick-and-place mechanism of the robot, and the relative position deviation between the marker center of the storage position marker and the preset position of the pick-and-place mechanism is determined again until a horizontal position error between the pick-and-place mechanism and the marker center of the storage position marker meets a set horizontal deviation threshold. In addition, if it is detected that the relative position deviation is less than or equal to the set threshold, the horizontal position adjustment of the pick-and-place mechanism of the robot is not performed.

In this embodiment, in addition to the horizontal position deviation, the robot may adjust the height of the pick-and-place mechanism by the lifting mechanism of the pick-and-place mechanism until a height error between the pick-and-place mechanism and the marker center of the storage position marker meets a set height deviation threshold. In this way, after calibrating the horizontal position and the height position of the pick-and-place mechanism, the pick-and-place mechanism can freely and quickly deposit the target inventory container into the corresponding storage position of the target inventory bracket only by pushing the target inventory container in the direction of the storage position.

Exemplarily, the following description is given by taking the X direction as an example of a retractable direction of the pick-and-place mechanism of the robot. When the robot runs to the first horizontal position $(Xr, Yr=Yt)$, a Y-direction coordinate $Yb$ of the center position of the fork holding assembly in the pick-and-place mechanism should be equal to $Yt$. However, due to factors such as uneven ground and a perpendicularity error of the lifting mechanism in the pick-and-place mechanism of the robot, there may be an error between $Yb$ and $Yt$, which is the horizontal position error determined by the marker detection device. In a case that the error exceeds the set threshold, such as 5 mm, the robot controls the robot body to move slowly along the Y direction and the opposite direction of the error, so that the absolute error becomes smaller. When the error meets the set threshold, the robot body is controlled to stop. Further, if the height error of the pick-and-place mechanism of the robot exceeds the set threshold, the lifting mechanism is controlled to slowly raise the height of the pick-and-place mechanism so that the height error of the pick-and-place mechanism is in the set threshold range.

In this embodiment, after adjusting and calibrating the horizontal position and the height of the robot, the horizontal position deviation and/or the height deviation between the marker center of the target pick-and-place marker and the preset position of the pick-and-place mechanism is in the preset deviation range. In this case, the robot can push the target inventory container into the corresponding storage position of the target inventory bracket for storage only by performing a simple push operation on the target inventory container by the pick-and-place mechanism without other operations of the pick-and-place mechanism, which simplifies the container depositing operation and improves the container depositing efficiency.

A robot is provided according to the embodiments of the present disclosure. With the solution of the present disclosure, when the robot deposits the inventory container in the storage region, the pick-and-place position of the pick-and-place mechanism of the robot is precisely located and moved in the case of the uneven ground of the storage region, so that the position deviation between the pick-and-place mechanism and the marker center of the target pick-and-place marker is in the preset deviation range, and thus the target inventory container can be pushed into the corresponding storage position of the target inventory bracket for storage only by performing a simply push operation on the target inventory container by the pick-and-place mechanism, which simplifies the container depositing operation and improves the container depositing efficiency.

Figure 5:
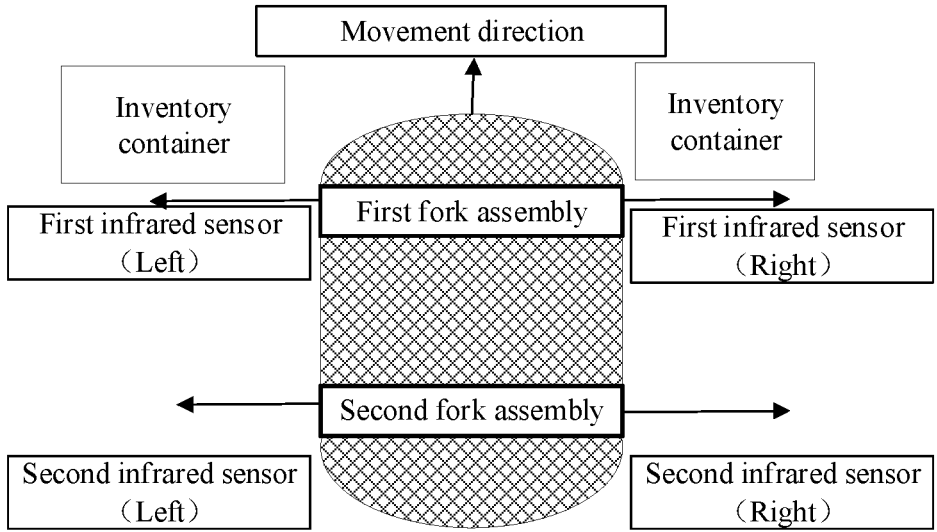
FIG. 5 is a schematic top view showing a robot aligning with an inventory container according to an embodiment of the present disclosure.

In an optional solution of this embodiment, the embodiment of the present disclosure may be combined with each optional solution in the above-mentioned one or more embodiments. FIG. 5 is a schematic top view showing a robot aligning with an inventory container according to an embodiment of the present disclosure. Referring to FIG. 5, in the robot provided in this embodiment, the fork holding assembly of the pick-and-place mechanism of the robot may include a first fork component and a second fork component. The first fork component is provided with a first infrared sensor, the second fork component is provided with a second infrared sensor, and the first fork component has a same retractable direction as the second fork component.

The master control and processing unit 110 is further configured to: after the pick-and-place mechanism 120 of the robot moves to the first height position, control the robot body to move near a position aligned with the target inventory container.

The master control and processing unit 110 is further configured to: control the pick-and-place mechanism to be aligned with the target inventory container according to a change of a signal acquired by the first infrared sensor and a change of a signal acquired by the second infrared sensor during the movement of the robot body.

In this embodiment, referring to FIG. 5, the fork holding assembly of the pick-and-place mechanism of the robot includes the first fork component and the second fork component. The first infrared sensor is arranged on the first fork component of the fork holding assembly of the pick-and-place mechanism, and the second infrared sensor is arranged on the second fork component of the fork holding assembly of the pick-and-place mechanism. In this way, after the fork holding assembly of the pick-and-place mechanism of the robot is raised to the first height, the robot can detect the position of the target inventory container by means of the change of the signal acquired by the first infrared sensor and the change of the signal acquired by the second infrared sensor, to achieve the alignment of the fork holding assembly of the pick-and-place mechanism with the target inventory container.

In this embodiment, optionally, if the fork holding assembly of the pick-and-place mechanism of the robot is a fork holding assembly having a single fork direction, the first infrared sensor may be arranged on the first fork component of the fork holding assembly, and the second infrared sensor may be arranged on the second fork component of the fork holding assembly. Still optionally, referring to FIG. 5, if the fork holding assembly of the pick-and-place mechanism of the robot is a fork holding assembly having two fork directions, the first fork component of the fork holding assembly may be provided with the first infrared sensor (left) and the second infrared sensor (left) respectively in the two fork directions, and the second fork component of the fork holding assembly may be provided with the first infrared sensor (right) and the second infrared sensor (right) respectively in the two fork directions.

In this embodiment, in the case that the robot is required to remove the stored target inventory container from the storage position of the target inventory bracket by the pick-and-place mechanism, before the robot body moves to a position level with the target inventory container, the robot lifts the fork holding assembly of the pick-and-place mechanism to the height of the target inventory container to be removed and controls the robot body to continue to move. Referring to FIG. 5, if the robot moves along the Y direction (in this case, the fork direction of the fork holding assembly of the pick-and-place mechanism is the X direction), the first infrared sensor performs signal acquisition by scanning the edge of the target inventory container, and a signal changes from absence to presence. Next, the robot body is controlled to continue to move, and the signal changes from presence to absence. When the robot stops, the signal of the second infrared sensor disappears. In this case, the target inventory container is located between the two fork components of the fork holding assembly, and thus the target inventory container can be removed by the pick-and-place mechanism.

In this embodiment, referring to FIG. 5, if the second infrared sensor detects a signal when the robot stops at the first horizontal position (Xr, Yr=Yt), the robot body is controlled to move back slowly, until the signal of the second infrared sensor disappears and the signal of the first infrared sensor disappears. In this case, the robot body is controlled to stop moving, and the target inventory container is located between the two fork components of the fork holding assembly of the pick-and-place mechanism.

In this embodiment, referring to FIG. 5, if the second infrared sensor detects no signal and the first infrared sensor detects the signal (the signal does not disappear after changing from absence to presence) when the robot stops at the first horizontal position (Xr, Yr=Yt), the robot body is controlled to move forward slowly, until the signal of the first infrared sensor disappears and the signal of the second infrared sensor disappears. In this case, the robot body is controlled to stop moving, and the target inventory container is located between the two fork components of the fork holding assembly of the pick-and-place mechanism.

FIG. 6 is a schematic flowchart showing a container depositing method based on a robot according to an embodiment of the present disclosure. This embodiment may be applied to a situation of accurately depositing an inventory container, especially a situation of quickly and accurately depositing an inventory container into an inventory bracket. The method may be performed by the robot provided in the above embodiments. The robot includes a robot body and a pick-and-place mechanism. The robot body runs on a plane of a storage region, and the storage region is provided with an inventory bracket for storing an inventory container. As shown in FIG. 6, the container depositing method based on a robot according to the embodiment of the present disclosure may include the following steps S610 to S640.

In S610, according to target deposit-removal position information of a target inventory container, the robot body is controlled to move to a first horizontal position, and the pick-and-place mechanism is controlled to move to a first height position.

In S620, in a case that the robot body and the pick-and-place mechanism stop moving, a target storage position marker provided at a target storage position in a view field including a target inventory bracket is detected by a marker detection device.

In S630, a position of the pick-and-place mechanism is calibrated according to a position of the target storage position marker.

In S640, in a case that the calibration is completed, a carried target inventory container is deposited at the target storage position on the target inventory bracket.

Based on the technical solutions of the above embodiments, optionally, controlling the pick-and-place mechanism to move to the first height position may include:

controlling a lifting mechanism to lift the pick-and-place mechanism; and detecting a height of the pick-and-place mechanism relative to the plane of the storage region in real time, and stopping the lifting when the pick-and-place mechanism is lifted to the first height position, where a relative height indicated by the first height position is greater than a storage height indicated by the target deposit-removal position information.

Based on the technical solutions of the above embodiments, optionally, the marker detection device is arranged at a lower end of a fork holding assembly of the pick-and-place mechanism, and the target storage position marker at a distance from the marker detection device being less than a predetermined distance is in a detection view field of the marker detection device.

Based on the technical solutions of the above embodiments, optionally, the target storage position marker is used to assist in locating the target storage position required for the target inventory container to perform the container depositing operation, and the target storage position marker is set at a preset position of the target storage position.

Based on the technical solutions of the above embodiments, optionally, calibrating the position of the pick-and-place mechanism according to the position of the target storage position marker includes:

determining a relative position deviation between a marker center of the target storage position marker and a preset position of the pick-and-place mechanism, where the relative position deviation includes a horizontal position deviation and/or a height position deviation; and if the relative position deviation does not meet a preset deviation condition, controlling the robot body to move from the first horizontal position to a second horizontal position, to drive a horizontal position adjustment of the pick-and-place mechanism of the robot; and/or controlling the pick-and-place mechanism of the robot to move from the first height position to a second height position, so that a relative position deviation between the marker center and the preset position of the pick-and-place mechanism after the movement meets the preset deviation condition.

The container depositing method based on a robot provided in the embodiment of the present disclosure may be performed by the robot provided in any of the above-mentioned embodiments of the present disclosure, and has the corresponding functions and beneficial effects of the robot performing the container depositing method based on a robot. For the technical details not described in detail in the above embodiments, reference may be made to the operation process of the robot provided in any embodiment of the present disclosure.

FIG. 7 is a schematic flowchart showing a container removing method based on a robot according to an embodiment of the present disclosure. This embodiment may be applied to a situation of accurately removing an inventory container, especially a situation of quickly and accurately removing an inventory container from an inventory bracket. The method may be performed by the robot provided in the above embodiments. The robot includes a robot body and a pick-and-place mechanism. The robot body runs on a plane of a storage region, and the storage region is provided with an inventory bracket for storing an inventory container. As shown in FIG. 7, the container removing method based on a robot according to the embodiment of the present disclosure may include the following steps S710 to S740.

In S710, according to target deposit-removal position information of a target inventory container, the robot body is controlled to move to a first horizontal position, and the pick-and-place mechanism is controlled to move to a first height position.

In S720, in a case that the robot body and the pick-and-place mechanism stop moving, at least two target container edges of the target inventory container in a view field including a target inventory bracket is detected by an edge detection device.

In S730, a position of the pick-and-place mechanism is calibrated according to positions of the at least two target container edges.

In S740, in a case that the calibration is completed, the stored target inventory container is removed from a target storage position of the target inventory bracket.

Based on the technical solutions of the above embodiments, optionally, controlling the pick-and-place mechanism to move to the first height position may include:

controlling a lifting mechanism to lift the pick-and-place mechanism; and detecting a height of the pick-and-place mechanism relative to the plane of the storage region in real time, and stopping the lifting when the pick-and-place mechanism is lifted to the first height position, where a relative height indicated by the first height position is less than a storage height indicated by the target deposit-removal position information.

Based on the technical solutions of the above embodiments, optionally, the target container edge is a container structure feature at an edge of the target inventory container, and the target container edge is used to assist in locating the target inventory container placed at the target storage position to perform the container removing operation.

Based on the technical solutions of the above embodiments, optionally, the edge detection device is arranged at an upper end of a fork holding assembly of the pick-and-place mechanism, and the target container edge of the target inventory container at a distance from the edge detection device being less than a predetermined distance is in a detection view field of the edge detection device.

Based on the technical solutions of the above embodiments, optionally, calibrating the position of the pick-and-place mechanism according to the positions of the at least two target container edges includes:

determining a container center of the target inventory container according to the positions of the at least two target container edges;

determining a relative position deviation between the container center and a preset position of the pick-and-place mechanism, where the relative position deviation includes a horizontal position deviation and/or a height position deviation; and if the relative position deviation does not meet a preset deviation condition, controlling the robot body to move from the first horizontal position to a second horizontal position, to drive a horizontal position adjustment of the pick-and-place mechanism of the robot; and/or controlling the pick-and-place mechanism of the robot to move from the first height position to a second height position, so that a relative position deviation between the marker center and the preset position of the pick-and-place mechanism after the movement meets the preset deviation condition.

Based on the technical solutions of the above embodiments, optionally, the method further includes:

after the pick-and-place mechanism of the robot moves to the first height position, controlling the robot body to move near a position aligned with the target inventory container; and controlling the pick-and-place mechanism to be aligned with the target inventory container according to a change of a signal acquired by a first infrared sensor provided on the pick-and-place mechanism and a change of a signal acquired by a second infrared sensor provided on the pick-and-place mechanism during the movement of the robot body, where the first infrared sensor is mounted on a first fork component of a fork holding assembly of the pick-and-place mechanism, and the second infrared sensor is mounted on a second fork component of the fork holding assembly of the pick-and-place mechanism.

The container removing method based on a robot provided in the embodiment of the present disclosure may be performed by the robot provided in any of the above-mentioned embodiments of the present disclosure, and has the corresponding functions and beneficial effects of the robot performing the container removing method based on a robot. For the technical details not described in detail in the above embodiments, reference may be made to the operation process of the robot provided in any embodiment of the present disclosure.

In the description of this specification, the description with reference to the terms such as "one embodiment," "some embodiments," "example," "specific example," or "some examples" means that, specific features, structures, materials, or characteristics described in connection with the embodiment or example are included in at least one embodiment or example of the present disclosure. In this specification, schematic statements of the above terms do not necessarily refer to the same embodiment or example. Furthermore, the described specific features, structures, materials or characteristics may be combined in any suitable manner in any one or more embodiments or examples.

It should be noted that the above are only preferred embodiments of the present disclosure and applied technical principles. Those skilled in the art understand that, the present disclosure is not limited to the specific embodiments described herein. Various apparent changes, readjustments and substitutions can be made by those skilled in the art without departing from the protection scope of the present disclosure. Therefore, although the present disclosure has been described in detail through the above embodiments, the present disclosure is not limited to the above embodiments, and may further include more other equivalent embodiments without departing from the concept of the present disclosure. The scope of the present disclosure is determined by the scope of the appended claims.

The invention claimed is:

1. A transferring robot, comprising: a master control and processing unit, a pick-and-place mechanism, and a marker detection unit, wherein a robot body runs on a plane of a storage region, the storage region is provided with an inventory bracket for storing an inventory container, and the marker detection unit is arranged on the pick-and-place mechanism, and wherein:

the master control and processing unit is configured to:
according to target deposit-removal position information of a target inventory container, control the robot body to move to a first horizontal position and control the pick-and-place mechanism to move to a first height position;

the marker detection unit comprises at least one of a marker detection device or an edge detection device, wherein the marker detection device is configured to: in a case that the robot body and the pick-and-place mechanism stop moving, detect a target storage position marker provided at a target storage position in a view field comprising a target inventory bracket; wherein the edge detection device is configured to: in a case that the robot body and the pick-and-place mechanism stop moving, detect at least two target container edges of the target inventory container in a view field comprising a target inventory bracket; and the master control and processing unit is further configured to:
calibrate a position of the pick-and-place mechanism according to a position of the target storage position marker, and deposit a carried target inventory container at the target storage position on the target inventory bracket in a case that the calibration is completed; or
calibrate a position of the pick-and-place mechanism according to positions of the at least two target container edges; and remove a stored target inventory container from the target storage position on the target inventory bracket in a case that the calibration is completed.

2. The transferring robot according to claim 1, wherein the master control and processing unit is further configured to determine one of: a relative position deviation between a marker center of the target storage position marker and a preset position of the pick-and-place mechanism or a relative position deviation between a container center of the at least two target container edges and a preset position of the pick-and-place mechanism, wherein the relative position deviation comprises at least one of a horizontal position deviation or a height position deviation; and if the relative position deviation does not meet a preset deviation condition, the master control and processing unit is further configured to control at least one of:
the robot body to move from the first horizontal position to a second horizontal position, to drive a horizontal position adjustment of the pick-and-place mechanism of the robot; or
the pick-and-place mechanism of the robot to move from the first height position to a second height position, so that the relative position deviation between the marker center and the preset position of the pick-and-place mechanism after the movement meets the preset deviation condition.

3. The transferring robot according to claim 1, wherein for controlling the robot body to move to the first horizontal position according to the target deposit-removal position information of the target inventory container, the master control and processing unit is configured to:

acquire a navigation path of the robot on the plane of the storage region according to a horizontal position coordinate indicated by the target deposit-removal position information; and control, based on the navigation path, the robot to travel to a first horizontal position aligned with the horizontal position indicated by the target deposit-removal position information.

4. The robot according to claim 3, wherein for controlling the robot to travel based on the navigation path, the master control and processing unit is further configured to:

determine a horizontal position of the robot body on the plane of the storage region and a traveling direction of the robot body in real time; and correct, based on the horizontal position and the traveling direction determined in real time, a traveling deviation of the robot body on the plane of the storage region.

5. The transferring robot according to claim 1, wherein the marker detection device is arranged at a lower end of a fork holding assembly of the pick-and-place mechanism, and the target storage position marker at a distance from the marker detection device being less than a predetermined distance is in a detection view field of the marker detection device;

the edge detection device is arranged at an upper end of a fork holding assembly of the pick-and-place mechanism, and a target container edge of the target inventory container at a distance from the edge detection device being less than a predetermined distance is in a detection view field of the edge detection device.

6. The transferring robot according to claim 5, wherein the fork holding assembly of the pick-and-place mechanism comprises a first fork component and a second fork component, the first fork component is provided with a first infrared sensor, the second fork component is provided with a second infrared sensor, and the first fork component has a same retractable direction as the second fork component;

the master control and processing unit is further configured to: after the pick-and-place mechanism of the robot moves to the first height position, control the robot body to move near a position aligned with the target inventory container; and the master control and processing unit is further configured to: control the pick-and-place mechanism to be aligned with the target inventory container according to a change of a signal acquired by the first infrared sensor and a change of a signal acquired by the second infrared sensor during the movement of the robot body.

7. The transferring robot according to claim 1, wherein a target container edge is a container structure feature at an edge of the target inventory container, and the target container edge is used to assist in locating the target inventory container placed at the target storage position to perform the container removing operation.

8. The transferring robot according to claim 7, wherein the edge detection device is configured to acquire at least three container edges from at least three sides of the target inventory container facing a side of the target inventory container, or acquire a complete container edge of the target inventory container.

9. The transferring robot according to claim 1, wherein the robot body is further provided with a lifting mechanism;

the master control and processing unit is further configured to control the lifting mechanism to lift the height of the pick-and-place mechanism; and the master control and processing unit is further configured to detect a height of the pick-and-place mechanism relative to the plane of the storage region in real time, and stop the lifting when the pick-and-place mechanism is lifted to the first height position.

10. The transferring robot according to claim 9, wherein the master control and processing unit is further configured to:

while controlling the robot body to move to the first horizontal position of the plane of the storage region, control the lifting mechanism for the pick-and-place mechanism to lift the height of the pick-and-place mechanism of the robot relative to the plane of the storage region; or after controlling the robot body to move to the first horizontal position of the plane of the storage region and stop moving, control the lifting mechanism for the pick-and-place mechanism to lift the height of the pick-and-place mechanism of the robot relative to the plane of the storage region.

11. The transferring robot according to claim 9, wherein the master control and processing unit is further configured to:

detect, by a wire-pull encoder or a position detection sensor, the height of the pick-and-place mechanism relative to the plane of the storage region in real time; and if it is detected that the height of the pick-and-place mechanism relative to the plane of the storage region where the robot runs reaches the first height position, control the lifting mechanism for the pick-and-place mechanism to stop lifting, wherein the first height position is determined based on a height position coordinate indicated by the target deposit-removal position information and a preset height deviation.

12. A transferring method based on a robot, wherein the robot comprises a robot body and a pick-and-place mechanism, the robot body runs on a plane of a storage region, and the storage region is provided with an inventory bracket for storing an inventory container, and wherein the method comprises:

controlling the robot body to move to a first horizontal position and controlling the pick-and-place mechanism to move to a first height position according to target deposit-removal position information of a target inventory container;

detecting, by a marker detection device, a target storage position marker provided at a target storage position in a view field comprising a target inventory bracket in a case that the robot body and the pick-and-place mechanism stop moving, or detecting, by an edge detection device, at least two target container edges of the target inventory container in a view field comprising the target inventory bracket in a case that the robot body and the pick-and-place mechanism stop moving;

calibrating a position of the pick-and-place mechanism according to a position of the target storage position marker or positions of the at least two target container edges; and depositing a carried target inventory container at the target storage position on the target inventory bracket in a case that the calibration is completed or removing a stored target inventory container from the target storage position on the target inventory bracket.

13. The method according to claim 12, wherein controlling the robot body to move to the first horizontal position according to the target deposit-removal position information of the target inventory container comprises:

acquiring a navigation path of the robot on the plane of the storage region according to the horizontal position coordinate indicated by the target deposit-removal position information; and controlling, based on the navigation path, the robot to travel to a first horizontal position aligned with the horizontal position indicated by the target deposit-removal position information, wherein, determining a horizontal position of the robot body on the plane of the storage region and a traveling direction of the robot body in real time in a process of controlling the robot to travel based on the navigation path; and correcting, based on the horizontal position and the traveling direction determined in real time, a traveling deviation of the robot body on the plane of the storage region.

14. The method according to claim 12, wherein the marker detection device is arranged at a lower end of a fork holding assembly of the pick-and-place mechanism, and the target storage position marker at a distance from the marker detection device being less than a predetermined distance is in a detection view field of the marker detection device;

the edge detection device is arranged at an upper end of a fork holding assembly of the pick-and-place mechanism, and the target container edge of the target inventory container at a distance from the edge detection device being less than a predetermined distance is in a detection view field of the edge detection device.

15. The method according to claim 12, wherein calibrating a position of the pick-and-place mechanism according to a position of the target storage position marker or positions of the at least two target container edges comprises:

determining one of: a relative position deviation between a marker center of the target storage position marker and a preset position of the pick-and-place mechanism or a relative position deviation between a container center of the at least two target container edges and a preset position of the pick-and-place mechanism, wherein the relative position deviation comprises at least one of a horizontal position deviation or a height position deviation; and if the relative position deviation does not meet a preset deviation condition, controlling the robot body to move from the first horizontal position to a second horizontal position, to drive a horizontal position adjustment of the pick-and-place mechanism of the robot; and/or controlling the pick-and-place mechanism of the robot to move from the first height position to a second height position, so that the relative position deviation between the marker center and the preset position of the pick-and-place mechanism after the movement meets the preset deviation condition.

16. The method according to claim 12, further comprising:

after the pick-and-place mechanism of the robot moves to the first height position, controlling the robot body to move near a position aligned with the target inventory container; and controlling the pick-and-place mechanism to be aligned with the target inventory container according to a change of a signal acquired by a first infrared sensor provided on the pick-and-place mechanism and a change of a signal acquired by a second infrared sensor provided on the pick-and-place mechanism during the movement of the robot body, wherein the first infrared sensor is mounted on a first fork component of a fork holding assembly of the pick-and-place mechanism, and the second infrared sensor is mounted on a second fork component of the fork holding assembly of the pick-and-place mechanism.

17. The method according to claim 1, wherein controlling the pick-and-place mechanism to move to the first height position comprises:

controlling the lifting mechanism for the pick-and-place mechanism to lift the height of the pick-and-place mechanism; and detecting a height of the pick-and-place mechanism relative to the plane of the storage region in real time, and stopping the lifting when the pick-and-place mechanism is lifted to the first height position.

18. The method according to claim 17, wherein controlling the robot body to move to the first horizontal position and controlling the pick-and-place mechanism to move to the first height position according to the target deposit-removal position information of the target inventory container comprises:

while controlling the robot body to move to the first horizontal position of the plane of the storage region, controlling the lifting mechanism for the pick-and-place mechanism to lift the height of the pick-and-place mechanism of the robot relative to the plane of the storage region; or after controlling the robot body to move to the first horizontal position of the plane of the storage region and stop moving, controlling the lifting mechanism for the pick-and-place mechanism to lift the height of the pick-and-place mechanism of the robot relative to the plane of the storage region.

19. The method according to claim 17, wherein the controlling the pick-and-place mechanism to move to the first height position comprises:

detecting, by a wire-pull encoder or a position detection sensor, the height of the pick-and-place mechanism relative to the plane of the storage region in real time; and controlling the lifting mechanism for the pick-and-place mechanism to stop lifting if it is detected that the height of the pick-and-place mechanism relative to the plane of the storage region where the robot runs reaches the first height position, wherein, the first height position is determined based on a height position coordinate indicated by the target deposit-removal position information and a preset height deviation.

20. A non-transitory computer-readable storage medium having instructions stored thereon, wherein instructions, when executed by a processor, implement a transferring method based on a robot, wherein the robot comprises a robot body and a pick-and-place mechanism, the robot body runs on a plane of a storage region, and the storage region is provided with an inventory bracket for storing an inventory container, and wherein the method comprises:

controlling the robot body to move to a first horizontal position and controlling the pick-and-place mechanism to move to a first height position according to target deposit-removal position information of a target inventory container;

detecting, by a marker detection device, a target storage position marker provided at a target storage position in a view field comprising a target inventory bracket in a case that the robot body and the pick-and-place mechanism stop moving, or detecting, by an edge detection device, at least two target container edges of the target inventory container in a view field comprising the target inventory bracket in a case that the robot body and the pick-and-place mechanism stop moving;

calibrating a position of the pick-and-place mechanism according to a position of the target storage position marker or positions of the at least two target container edges; and depositing a carried target inventory container at the target storage position on the target inventory bracket in a case that the calibration is completed or removing a stored target inventory container from the target storage position on the target inventory bracket.

* * * * *